United States Patent
Ohashi

(10) Patent No.: US 11,132,846 B2
(45) Date of Patent: *Sep. 28, 2021

(54) IMAGE GENERATION DEVICE, IMAGE GENERATION SYSTEM, IMAGE GENERATION METHOD, AND PROGRAM FOR PRODUCING AN AUGMENTED REALITY IMAGE

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/755,972

(22) PCT Filed: Oct. 18, 2018

(86) PCT No.: PCT/JP2018/038868
§ 371 (c)(1),
(2) Date: Apr. 14, 2020

(87) PCT Pub. No.: WO2019/082794
PCT Pub. Date: May 2, 2019

(65) Prior Publication Data
US 2020/0312033 A1  Oct. 1, 2020

(30) Foreign Application Priority Data

Oct. 25, 2017 (JP) .............................. JP2017-206444

(51) Int. Cl.
*G06T 19/00* (2011.01)
*G02B 27/01* (2006.01)
*G09G 5/377* (2006.01)

(52) U.S. Cl.
CPC .......... *G06T 19/006* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS 6,310,627 B1 * 10/2001 Sakaguchi ............. A41H 3/007
345/630
6,335,765 B1 * 1/2002 Daly ....................... G06F 3/011
345/419

(Continued)

FOREIGN PATENT DOCUMENTS

| JP | 2012146224 A | 8/2012 |
| JP | 2016122411 A | 7/2016 |

OTHER PUBLICATIONS

International Preliminary Report on Patentability and Written Opinion for corresponding PCT Application No. PCT/JP2018/038868, 12 pages, dated May 7, 2020.

(Continued)

*Primary Examiner* — Jwalant Amin
(74) *Attorney, Agent, or Firm* — Matthew B. Dernier, Esq.

(57) ABSTRACT

A rendering section renders a virtual space object to generate a computer graphics image. A superimposing section superimposes the computer graphics image on a captured real space image to generate a provisional superimposed image. A post-processing section performs post-processing on the provisional superimposed image. A chroma key generation section performs chroma key processing on the computer graphics image on the basis of depth information regarding the captured real space image, to thereby generate a chroma key image. A composing section masks the provisional (Continued)

superimposed image subjected to the post-processing with the chroma key image, to thereby generate a composed chroma key image. The composed chroma key image is superimposed on the captured real space image to generate an augmented reality image.

11 Claims, 10 Drawing Sheets

(52) U.S. Cl.
CPC .... *G02B 27/0179* (2013.01); *G02B 2027/011* (2013.01); *G09G 5/377* (2013.01)

(56) References Cited

U.S. PATENT DOCUMENTS

| | | | | |
|---|---|---|---|---|
| 6,445,815 | B1* | 9/2002 | Sato | H04N 13/221 |
| | | | | 382/154 |
| 8,045,825 | B2* | 10/2011 | Shimoyama | H04N 13/10 |
| | | | | 382/284 |
| 9,761,053 | B2* | 9/2017 | Dzhurinskiy | G06T 15/04 |
| 2011/0187707 | A1* | 8/2011 | Kaufman | A61B 1/0005 |
| | | | | 345/419 |
| 2011/0249090 | A1* | 10/2011 | Moore | G06T 19/006 |
| | | | | 348/43 |
| 2013/0321674 | A1* | 12/2013 | Cote | H04N 5/232123 |
| | | | | 348/242 |
| 2015/0260474 | A1* | 9/2015 | Rublowsky | A63F 13/213 |
| | | | | 434/16 |
| 2016/0189431 | A1 | 6/2016 | Ueda | |
| 2016/0364904 | A1* | 12/2016 | Parker | G06F 3/038 |
| 2018/0176483 | A1* | 6/2018 | Knorr | H04N 5/2723 |
| 2018/0268512 | A1* | 9/2018 | Pronovost | G06T 1/20 |
| 2018/0275748 | A1* | 9/2018 | Haraden | G06T 15/503 |
| 2019/0110054 | A1* | 4/2019 | Su | H04N 19/186 |

OTHER PUBLICATIONS

International Search Report for corresponding PCT Application No. PCT/JP2018/038868, 2 pages, dated Jan. 15, 2019.

* cited by examiner

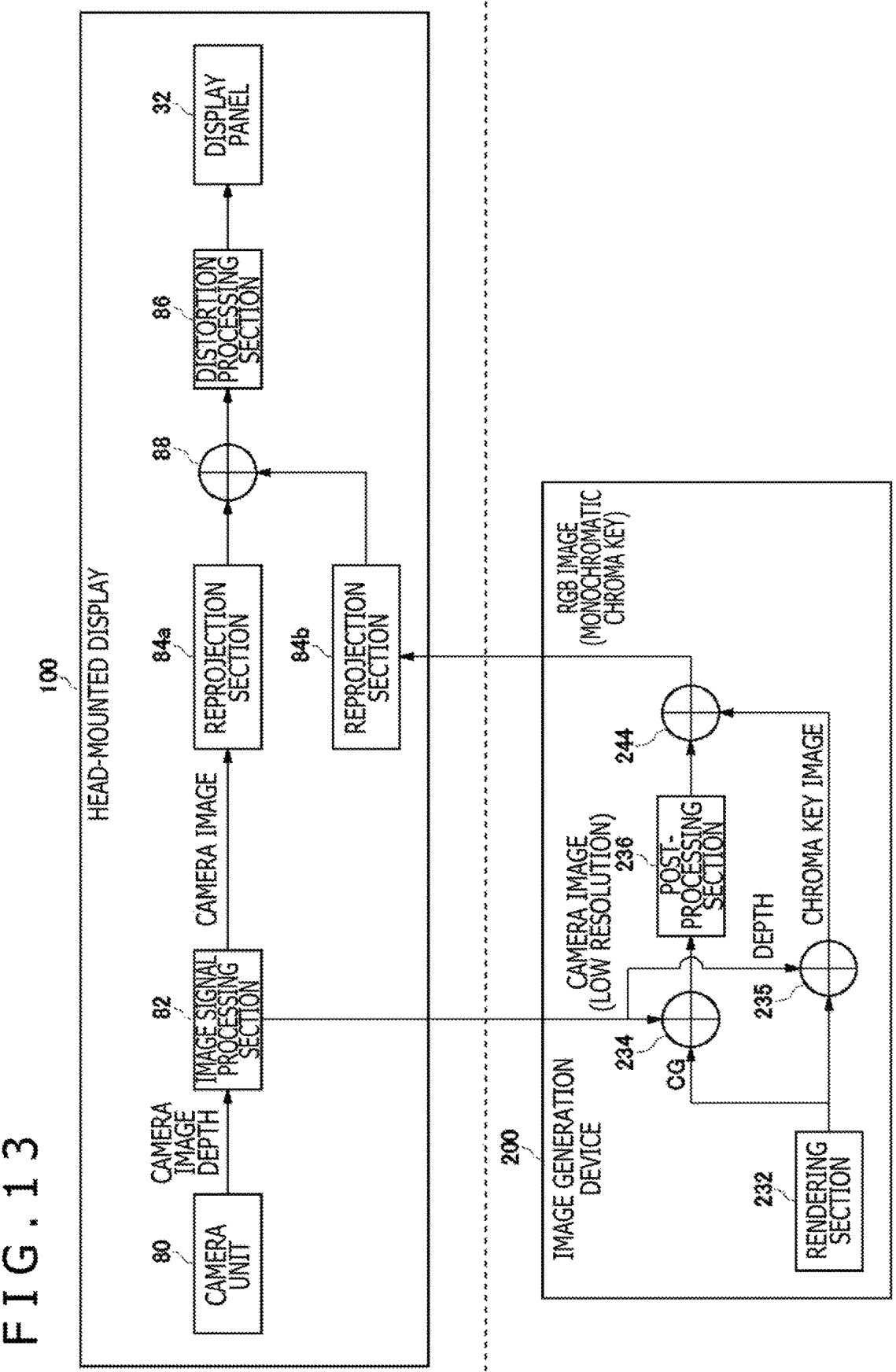

IMAGE GENERATION DEVICE, IMAGE GENERATION SYSTEM, IMAGE GENERATION METHOD, AND PROGRAM FOR PRODUCING AN AUGMENTED REALITY IMAGE

TECHNICAL FIELD

The present invention relates to a device, a system, and a method for generating an image.

BACKGROUND ART

It has been general practice to wear on the head a head-mounted display connected to a game console to play games by operating a controller or the line while watching a screen displayed on the head-mounted display. Wearing a head-mounted display allows a user to watch nothing but a video displayed on the head-mounted display. This has effects of enhancing a sense of immersion in a video world and boosting an entertaining property of a game. Further, a virtual reality (VR) video is displayed on the head-mounted display and the user wearing the head-mounted display turns the head. When a virtual space of the entire periphery to overlook a 360-degree direction is displayed, the sense of immersion in a video becomes higher, and also operability of an application of a game etc. is further improved.

Further, a user wearing a non-see-through head-mounted display cannot directly see the outside world, but there are video see-through head-mounted displays. A video see-through head-mounted display can capture an outside world video by a camera mounted on the head-mounted display to display the video on the display panel. The video see-through head-mounted display can also superimpose, on the outside world video captured by the camera, a virtual world object generated by computer graphics (CG) to generate and display an augmented reality (AR) video. Unlike virtual reality isolated from the real world, the augmented reality video is obtained by augmenting the real world with the virtual object and allows a user to experience the virtual world while interacting with the real world.

SUMMARY

Technical Problems

In a case where a virtual object generated by CG is superimposed on a camera image to generate an augmented reality video and the augmented reality video is displayed on a head-mounted display, aliasing sometimes occurs at a boundary of the virtual object due to the effects of post-processing on the image to make a boundary of the virtual world and the real world conspicuous, with the result that an immersive AR video may not be obtained.

The present invention has been made in view of such problems and has an object to provide an image generation device, an image generation system, and an image generation method that can improve quality of an augmented reality video.

Solution to Problems

In order to solve the above-mentioned problems, according to an aspect of the present invention, there is provided an image generation device including: a rendering section configured to render a virtual space object to generate a computer graphics image; a superimposing section configured to superimpose the computer graphics image on a captured real space image to generate a provisional superimposed image; a post-processing section configured to perform post-processing on the provisional superimposed image; a chroma key generation section configured to perform chroma key processing on the computer graphics image on the basis of depth information regarding the captured real space image, to thereby generate a chroma key image; and a composing section configured to mask the provisional superimposed image subjected to the post-processing with the chroma key image, to thereby generate a composed chroma key image. The composed chroma key image is superimposed on the captured real space image to generate an augmented reality image.

Another aspect of the present invention is an image generation system. This image generation system is an image generation system including a head-mounted display, and an image generation device. The image generation device includes: a rendering section configured to render a virtual space object to generate a computer graphics image; a first superimposing section configured to superimpose the computer graphics image on a captured real space image that is transmitted from the head-mounted display, to thereby generate a superimposed image; a post-processing section configured to perform post-processing on the superimposed image;

a chroma key generation section configured to perform chroma key processing on the computer graphics image on the basis of depth information regarding the captured real space image that is transmitted from the head-mounted display, to thereby generate a chroma key image; a first reprojection section configured to convert the superimposed image subjected to the post-processing and the chroma key image such that the superimposed image and the chroma key image match a new viewpoint position or line-of-sight direction; and a composing section configured to mask the superimposed image subjected to the post-processing and reprojection processing with the chroma key image subjected to the reprojection processing, to thereby generate a composed chroma key image. The head-mounted display includes: a second reprojection section configured to convert the captured real space image such that the captured real space image matches the new viewpoint position or line-of-sight direction; and a second superimposing section configured to compose the captured real space image subjected to the reprojection processing by the second reprojection section with the composed chroma key image that is transmitted from the image generation device, to thereby generate an augmented reality image.

Still another aspect of the present invention is also an image generation system. This image generation system is an image generation system including a head-mounted display, and an image generation device. The image generation device includes: a rendering section configured to render a virtual space object to generate a computer graphics image; a first superimposing section configured to superimpose the computer graphics image on a captured real space image that is transmitted from the head-mounted display, to thereby generate a provisional superimposed image; a post-processing section configured to perform post-processing on the provisional superimposed image; a chroma key generation section configured to perform chroma key processing on the computer graphics image on the basis of depth information regarding the captured real space image that is transmitted from the head-mounted display, to thereby generate a chroma key image; and a composing section configured to mask the provisional superimposed image subjected to the post-processing with the chroma key image, to thereby generate a composed chroma key image. The head-mounted display includes: a first reprojection section configured to convert the captured real space image such that the captured real space image matches a new viewpoint position or line-of-sight direction; a second reprojection section configured to convert the composed chroma key image that is transmitted from the image generation device such that the composed chroma key image matches the new viewpoint position or line-of-sight direction; and a second superimposing section configured to compose the captured real space image subjected to reprojection processing by the first reprojection section with the composed chroma key image subjected to the reprojection processing by the second reprojection section, to thereby generate an augmented reality image.

Yet another aspect of the present invention is an image generation method. This method includes: a rendering step of rendering a virtual space object to generate a computer graphics image; a superimposing step of superimposing the computer graphics image on a captured real space image to generate a provisional superimposed image; a post-processing step of performing post-processing on the provisional superimposed image; a chroma key generation step of performing chroma key processing on the computer graphics image on the basis of depth information regarding the captured real space image, to thereby generate a chroma key image; and a composing step of masking the provisional superimposed image subjected to the post-processing with the chroma key image, to thereby generate a composed chroma key image. The composed chroma key image is used for being superimposed on the captured real space image to generate an augmented reality image.

Note that an arbitrary combination of the above components and conversions of the expressions of the present invention between a method, a device, a system, a computer program, a data structure, a recoding medium, and the like are also effective as modes of the present invention.

Advantageous Effect of Invention

According to the present invention, it is possible to improve quality of an augmented reality video.

BRIEF DESCRIPTION OF DRAWINGS

FIG. 13 is a diagram illustrating a configuration of an image generation system according to the second embodiment, for superimposing a CG image on a camera image to generate an augmented reality image.

DESCRIPTION OF EMBODIMENTS

Figure 1:
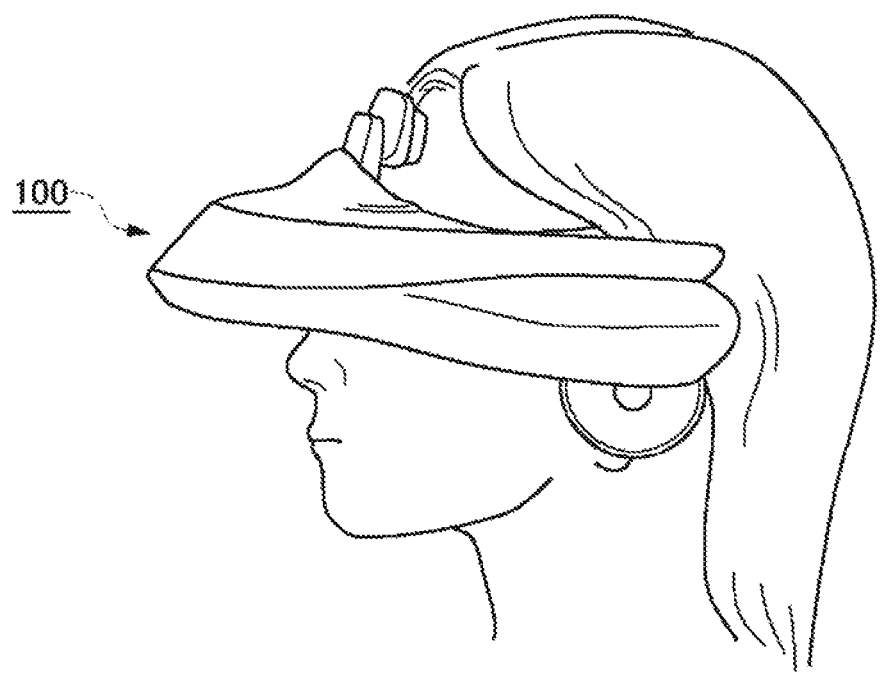
FIG. 1 is an appearance view of a head-mounted display.

FIG. 1 is an appearance view of a head-mounted display 100. The head-mounted display 100 is a display device that a user wears on the head to visually appreciate a still image, a moving image, or the like displayed on the display and to listen sound, music, or the like output from a headphone.

A gyro sensor, an acceleration sensor, or the like incorporated in or externally attached to the head-mounted display 100 permits measurement of positional information of the user's head wearing the head-mounted display 100 and orientation information such as a rotation angle and inclination of the head.

The head-mounted display 100 has a camera unit mounted thereon and can capture an image of the outside world while the user is wearing the head-mounted display 100.

The head-mounted display 100 is an example of a "wearable display." Here, a method of generating an image that is displayed on the head-mounted display 100 is described. An image generation method of an embodiment is, however, applicable not only to the head-mounted display 100 in a narrow sense but also to a case where glasses, a glass-type display, a glass-type camera, headphones, a headset (headphones equipped with a microphone), earphones, earrings, an ear-hanging camera, a hat, a hat equipped with a camera, a hairband, or the like is worn.

Figure 2:
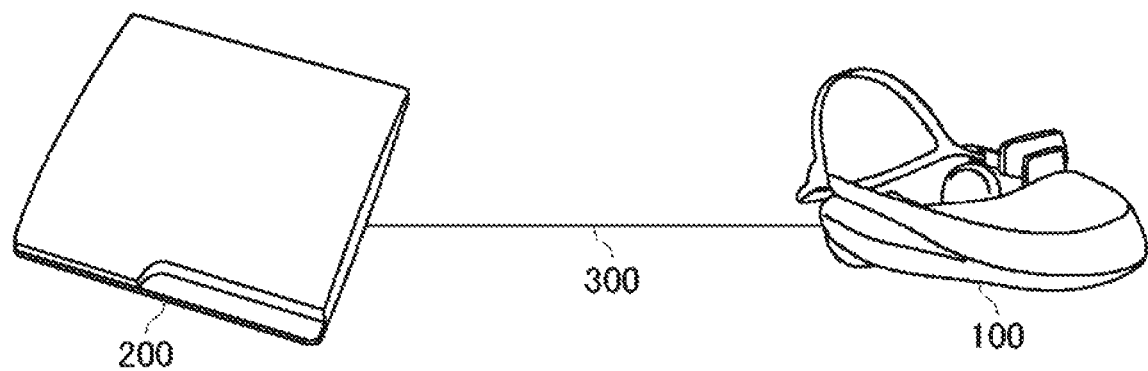
FIG. 2 is a configuration view of an image generation system according to an embodiment.

FIG. 2 is a configuration view of an image generation system according to the present embodiment. As an example, the head-mounted display 100 is connected to an image generation device 200 through an interface 300 that is, for example, a high-definition multimedia interface (registered trademark) (HDMI), which is the standard of communication interfaces configured to transmit a video or sound as a digital signal.

The image generation device 200 predicts, from current position/orientation information regarding the head-mounted display 100, position/orientation information regarding the head-mounted display 100 in consideration of a delay from the generation of a video to the display of the video. The image generation device 200 then draws, on the assumption of the predicted position/orientation information regarding the head-mounted display 100, an image to be displayed on the head-mounted display 100, and transmits the image to the head-mounted display 100.

The image generation device 200 is a game console, for example. The image generation device 200 may also be connected to a server via a network. In this case, the server may provide, to the image generation device 200, an online application such as a game in which a plurality of users can participate via networks. The head-mounted display 100 may be connected to a computer or a portable terminal instead of the image generation device 200.

With reference to FIG. 3 to FIG. 6, an augmented reality image obtained by superimposing a virtual object by CG on a camera image is described.

Figure 3:
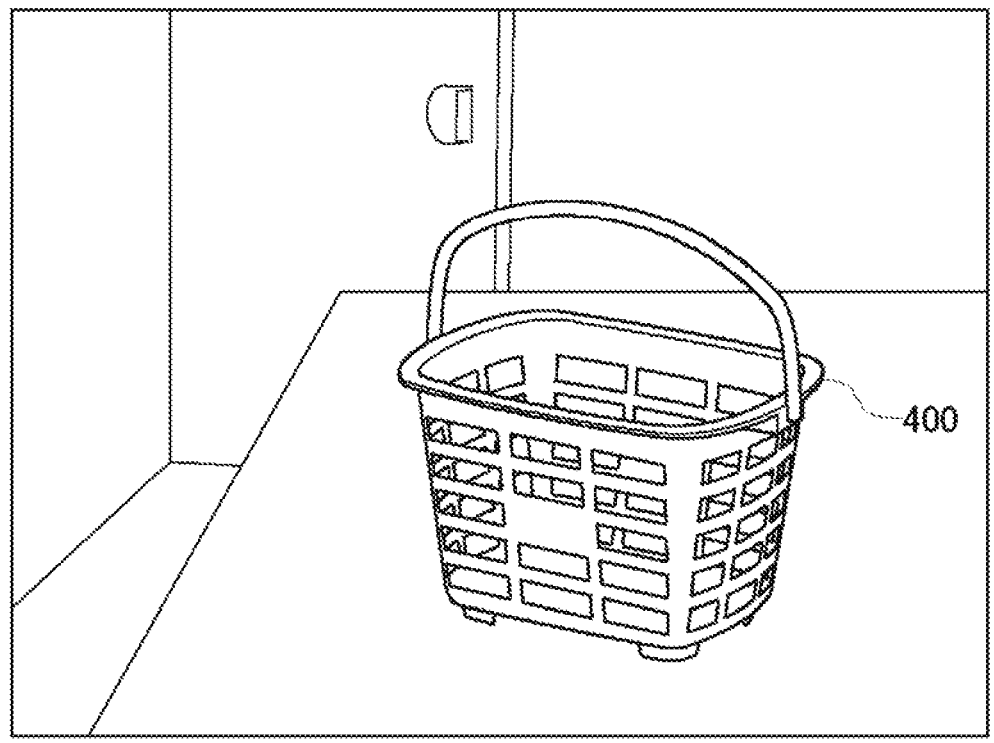
FIG. 3 is a view illustrating an example of a camera image that is captured by a camera mounted on the head-mounted display of FIG. 1.

FIG. 3 is a view illustrating an example of a camera image that is captured by a camera mounted on the head-mounted display 100. This camera image is obtained by capturing a table, and a basket 400 on the table in a room, with the room as a background of the image. In the camera image, the background hardly changes, but the user may reach the user's hand for the basket 400 on the table to move the basket 400.

Figure 4:
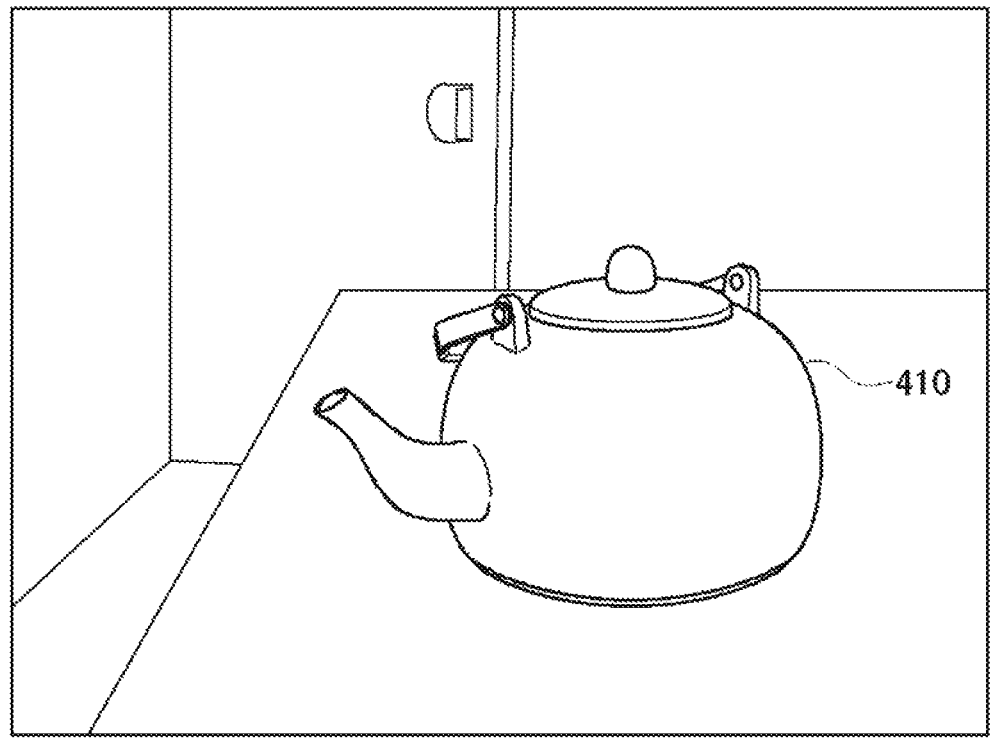
FIG. 4 is a view illustrating an augmented reality image obtained by superimposing a virtual object by CG on the camera image of FIG. 3.

FIG. 4 is a view illustrating an augmented reality image obtained by superimposing a virtual object by CG on the camera image of FIG. 3. The basket 400, which is a real object on the table, is replaced by a teapot 410, which is a virtual object generated by CG, and the teapot 410 is superimposed on the camera image. With this, the user can see the augmented reality image in which the virtual object is drawn in the real space on the head-mounted display 100.

Figure 5:
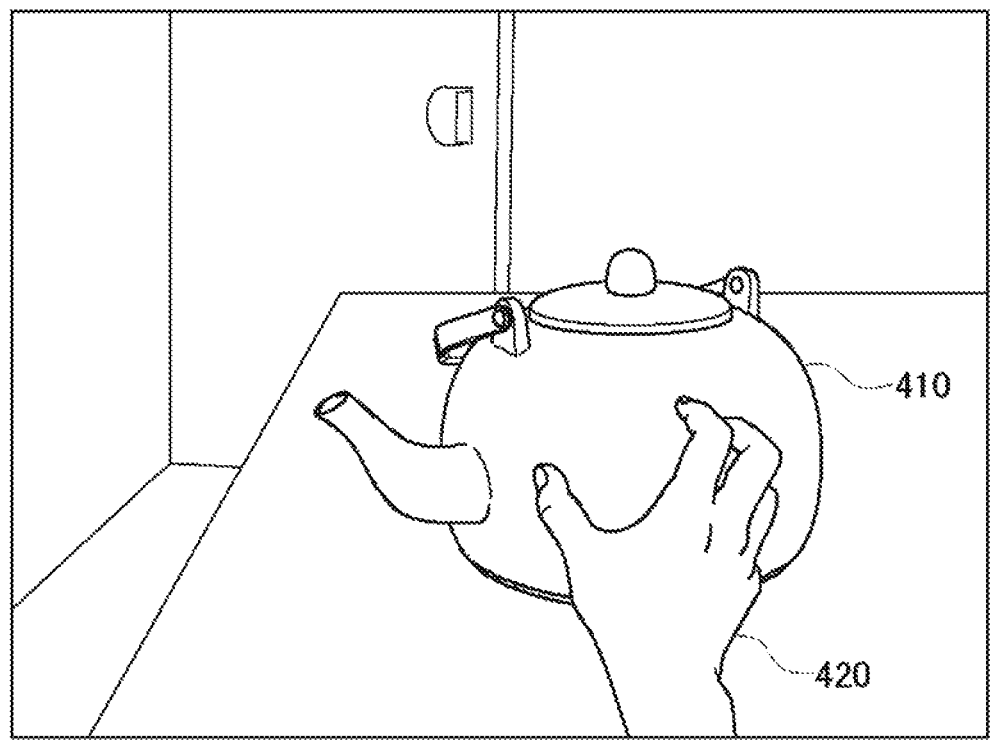
FIG. 5 is a view in which a user is reaching for the virtual object in the augmented reality image of FIG. 4.

FIG. 5 is a view in which the user is reaching the user's hand for the virtual object in the augmented reality image of FIG. 4. When the user seeing the augmented reality image through the head-mounted display 100 attempts to touch the teapot 410, which is the virtual object, the camera mounted on the head-mounted display 100 captures a hand of the user, with the result that a hand 420 appears in the camera image. On the camera image including the hand 420, the teapot 410, which is the virtual object, is superimposed. At this time, to prevent an unnatural augmented reality image in which, for example, the teapot 410 is superimposed on the hand 420 to hide the hand 420, it is necessary to correctly determine a positional relation between the teapot 410 and the hand 420 with the use of depth information.

Accordingly, a positional relation between an object appearing in a camera image and a virtual object is determined with the use of depth information regarding the camera image, and drawing is performed while a depth is correctly reflected. Since the depth of each of the background being the room and the basket 400 whose existence has been already known are known in advance, respective positional relations between the virtual object and the background and the basket 400 can be determined in advance. However, a depth of the user's hand or leg being stretched or a moving body other than the user (for example, another person, a dog, or a cat) coming in a field of view is not known in advance. It is thus necessary to determine such a depth each time from the depth information regarding the camera image.

In general, when a CG image is superimposed on a camera image, a chroma key image in which a region of the CG image that is not to be drawn, such as a background, is filled with one specific color is created, and the chroma key image is used in chroma key compositing. Since the region in the color specified as a chroma key (referred to as "chroma key region") is displayed as a transparent region, the camera image is displayed in the chroma key region when the chroma key image is superimposed on the camera image.

Figure 6:
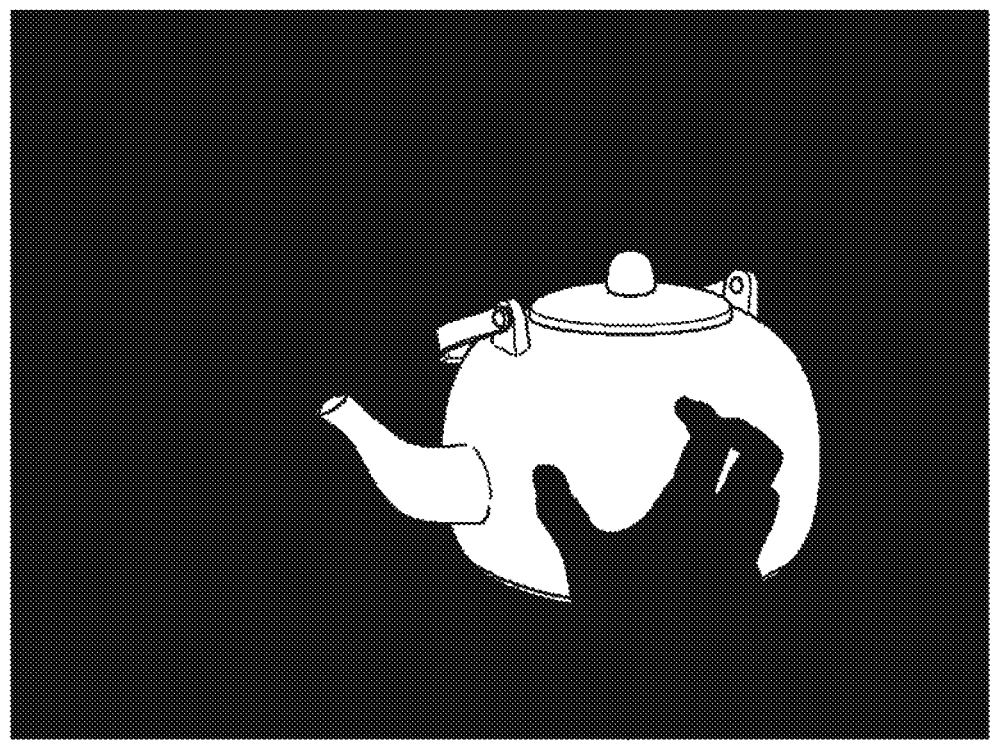
FIG. 6 is a view illustrating a CG image that is used in chroma key compositing.

FIG. 6 is a view illustrating a CG image that is used in chroma key compositing. In the state of FIG. 5, the background is filled with a specific color (for example, red) that is a chroma key. Further, the hand 420 appearing in the camera image is positioned in front of the teapot 410, and hence, a region of the teapot 410 that is hidden by the hand 420 is also filled with the specific color that is the chroma key. When this chroma key image is superimposed on the camera image, the camera image remains in the transparent portions in the specific color that is the chroma key, and the augmented reality image of FIG. 5 is obtained.

Figure 7:
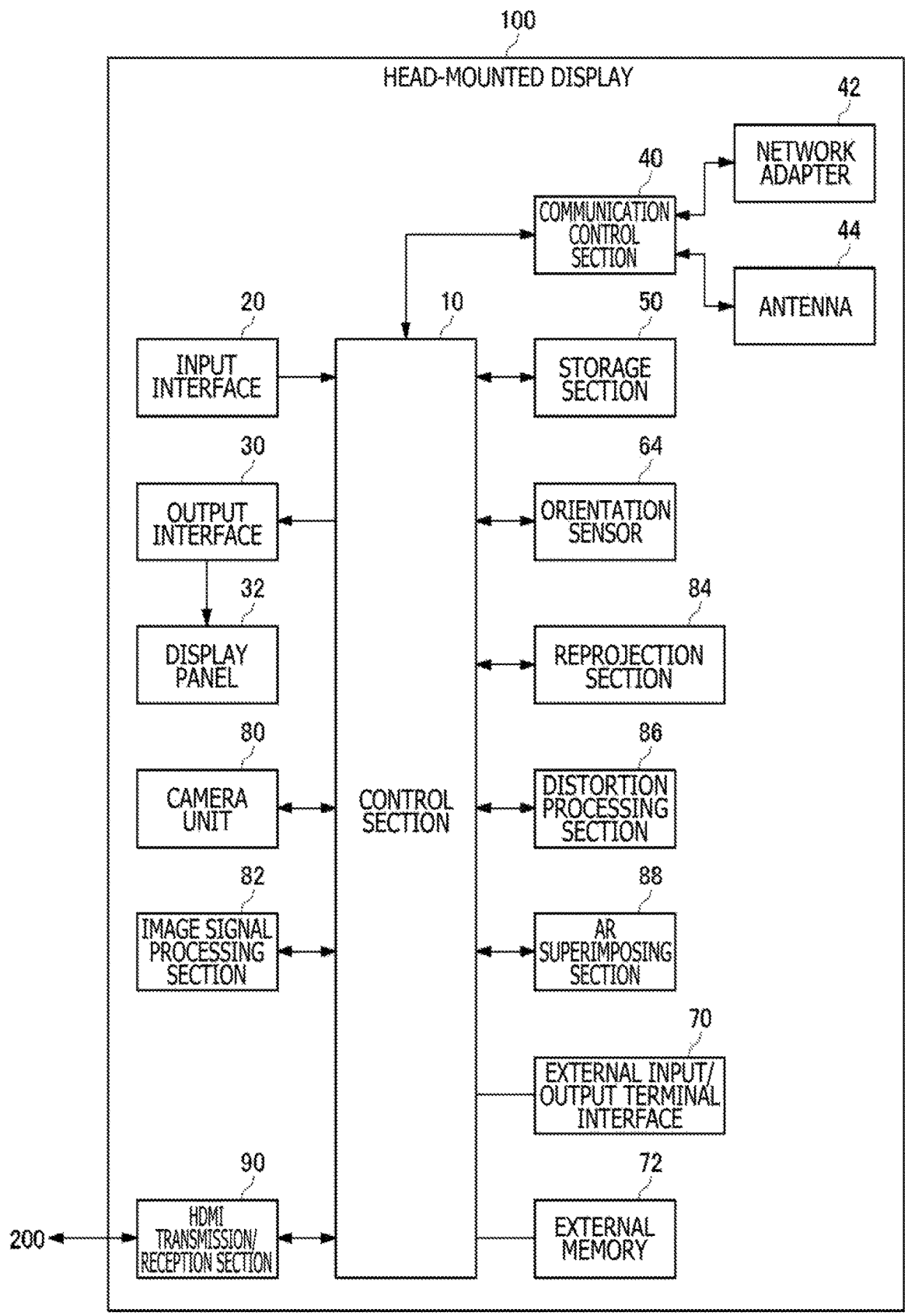
FIG. 7 is a functional configuration diagram of a head-mounted display according to a premise technique.

FIG. 7 is a functional configuration diagram of the head-mounted display 100 according to a premise technique.

A control section 10 is a main processor which processes signals such as an image signal and a sensor signal, an instruction, or data to output. An input interface 20 receives an operation signal or a setting signal from the user, and supplies the operation signal or the setting signal to the control section 10. An output interface 30 receives an image signal from the control section 10 and displays an image on the display panel 32.

A communication control section 40 transmits data that is input from the control section 10 to the outside through a network adapter 42 or an antenna 44 by wired or wireless communication. The communication control section 40 also receives data from the outside through the network adapter 42 or the antenna 44 by wired or wireless communication, and outputs the data to the control section 10.

A storage section 50 temporarily stores data, parameters, an operation signal, and the like that are processed by the control section 10.

An orientation sensor 64 detects position information regarding the head-mounted display 100 and orientation information such as a rotation angle and inclination of the head-mounted display 100. The orientation sensor 64 is achieved by a combination of a gyro sensor, an acceleration sensor, an angular acceleration sensor, and the like as appropriate. With the use of a motion sensor achieved by a combination of at least one of a 3-axis geomagnetic sensor, a 3-axis acceleration sensor, and a 3-axis gyro (angular velocity) sensor, the front-back, left-right, and up-down motions of the head of the user may be detected.

An external input/output terminal interface 70 is an interface for connecting peripheral equipment such as universal serial bus (USB) controllers. An external memory 72 is an external memory such as a flash memory.

A camera unit 80 includes components necessary for image capturing, such as a lens, an image sensor, and a ranging sensor, and supplies a captured outside world video and depth information to the control section 10. The control section 10 controls focusing and zooming of the camera unit 80, for example.

An image signal processing section 82 performs image signal processing (ISP), such as RGB conversion (demosaic processing), white balancing, color correction, and noise reduction, on a Raw image captured by the camera unit 80. The image signal processing section 82 also performs distortion correction processing of removing, for example, distortion due to an optical system of the camera unit 80. The image signal processing section 82 supplies, to the control section 10, a camera image subjected to the image signal processing and the distortion correction processing.

A reprojection section 84 performs reprojection processing on the camera image on the basis of the latest position/orientation information regarding the head-mounted display 100 detected by the orientation sensor 64. The reprojection section 84 converts the camera image into an image viewable from the latest viewpoint position/line-of-sight direction of the head-mounted display 100.

A distortion processing section 86 performs, on the camera image subjected to the reprojection processing, distortion processing of deforming (distorting) the image on the basis of distortion that occurs in the optical system of the head-mounted display 100. The distortion processing section 86 then supplies the camera image subjected to the distortion processing to the control section 10.

An AR superimposing section 88 superimposes a CG image generated by the image generation device 200 on the camera image subjected to the distortion processing to generate an augmented reality image, and supplies the augmented reality image to the control section 10.

An HDMI transmission/reception section 90 transmits or receives video and sound digital signals to or from the image generation device 200 in accordance with the HDMI. The HDMI transmission/reception section 90 receives, from the control section 10, an RGB image subjected to the image signal processing and distortion correction processing by the image signal processing section 82 and depth information, and transmits the RGB image and the depth information to the image generation device 200 through an HDMI transmission line. The HDMI transmission/reception section 90 receives an image generated by the image generation device 200 from the image generation device 200 through the HDMI transmission line, and supplies the image to the control section 10.

The control section 10 can supply an image or text data to the output interface 30 and cause the display panel 32 to display the image or the text data. The control section 10 can also supply an image or text data to the communication control section 40 to transmit the image or the text data to the outside.

Through the communication control section 40 or the external input/output terminal interface 70, the image generation device 200 is notified of current position/orientation information regarding the head-mounted display 100 detected by the orientation sensor 64. Alternatively, the HDMI transmission/reception section 90 may transmit current position/orientation information regarding the head-mounted display 100 to the image generation device 200.

Figure 8:
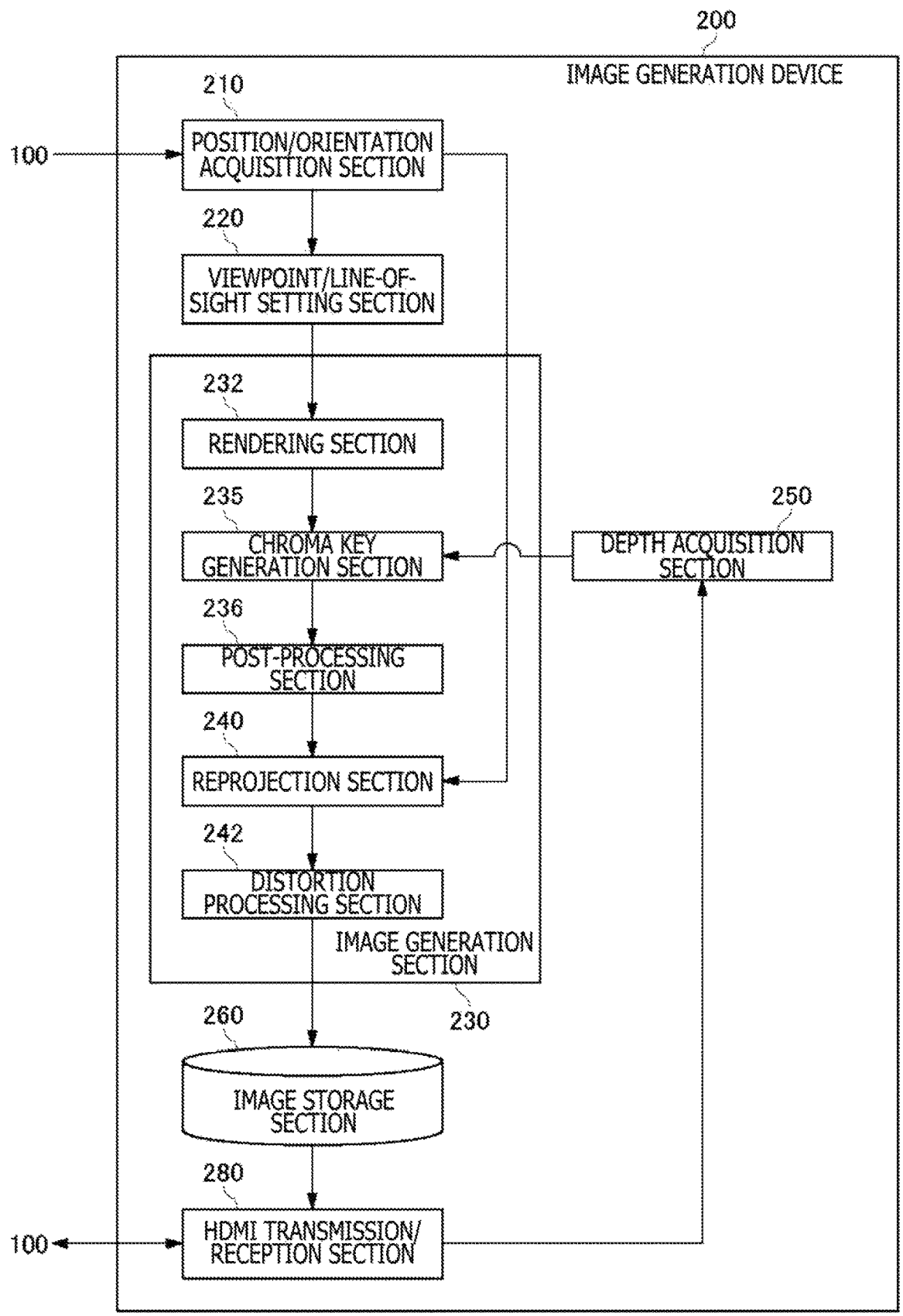
FIG. 8 is a functional configuration diagram of an image generation device according to the premise technique.

FIG. 8 is a functional configuration diagram of the image generation device 200 according to the premise technique. FIG. 8 illustrates a block diagram focusing on functions, and these functional blocks can be achieved in various forms such as hardware only, software only, or a combination thereof.

At least some of the functions of the image generation device 200 may be implemented on the head-mounted display 100. Alternatively, at least some of the functions of the image generation device 200 may be implemented on a server connected to the image generation device 200 via a network.

A position/orientation acquisition section 210 acquires current position/orientation information regarding the head-mounted display 100 from the head-mounted display 100.

A viewpoint/line-of-sight setting section 220 sets the viewpoint position and line-of-sight direction of the user by using position/orientation information regarding the head-mounted display 100 acquired by the position/orientation acquisition section 210.

An HDMI transmission/reception section 280 receives, from the head-mounted display 100, depth information regarding a real space video captured by the camera unit 80, and supplies the depth information to a depth acquisition section 250.

An image generation section 230 reads out data necessary for computer graphics generation from an image storage section 260, and renders a virtual space object to generate a CG image. The image generation section 230 generates a chroma key image from the CG image on the basis of depth information regarding a real space camera image that is supplied from the depth acquisition section 250, and outputs the chroma key image to the image storage section 260.

The image generation section 230 includes a rendering section 232, a chroma key generation section 235, a post-processing section 236, a reprojection section 240, and a distortion processing section 242.

The rendering section 232 renders, in accordance with the viewpoint position and line-of-sight direction of the user set by the viewpoint/line-of-sight setting section 220, a virtual space object viewable from the viewpoint position of the user wearing the head-mounted display 100 in the line-of-sight direction to generate a CG image. The rendering section 232 sends the CG image to the chroma key generation section 235.

The chroma key generation section 235 generates a chroma key image from the CG image on the basis of depth information regarding the camera image sent from the depth acquisition section 250. Specifically, the chroma key generation section 235 determines a positional relation between a real space object and a virtual space object to generate a chroma key image in which a background of the virtual object and a portion of the real space object that is positioned in front of the virtual object in the CG image are filled with one specific color (for example, red) (referred to as a "CG chroma key image").

The post-processing section 236 performs post-processing such as depth of field adjustment, tone mapping, and anti-aliasing on the CG chroma key image in such a way that the CG chroma key image appears natural and smooth.

The reprojection section 240 receives the latest position/orientation information regarding the head-mounted display 100 from the position/orientation acquisition section 210, and performs the reprojection processing on the CG chroma key image subjected to the post-processing. The reprojection section 240 converts the CG chroma key image into an image viewable from the latest viewpoint position/line-of-sight direction of the head-mounted display 100.

Here, reprojection is described. In a case where the head-mounted display 100 having a head tracking function generates a virtual reality video while changing the viewpoint and the line-of-sight direction along with the motion of the head of the user, there is a delay from the generation of the virtual reality video to display of the virtual reality video. The direction of the head of the user that is used as an assumption at the time of video generation is thus deviated from the direction of the head of the user at the time when the video is displayed on the head-mounted display 100, with the result that the user gets kind of sick (called "virtual reality (VR) sickness," for example) in some cases.

In this way, some time is taken for detection of a motion of the head-mounted display 100, issue of a drawing command by a central processing unit (CPU), execution of rendering by a graphics processing unit (GPU), and output of a drawn image to the head-mounted display 100. It is assumed that drawing is performed at a frame rate of 60 fps (frame/second), for example, and a delay of one frame occurs between the detection of the motion of the head-mounted display 100 and image output. One frame corresponds to approximately 16.67 milliseconds at the frame rate of 60 fps, which is long enough to be sensed by human beings.

Accordingly, processing called "time warp" or "reprojection" is performed to correct the rendered image in accordance with the latest position and orientation of the head-mounted display 100, to thereby prevent human beings from sensing deviations.

The distortion processing section 242 performs, on the CG chroma key image subjected to the reprojection processing, distortion processing of deforming (distorting) the image on the basis of distortion that occurs in the optical system of the head-mounted display 100. The distortion processing section 242 then stores the CG chroma key image in the image storage section 260.

The HDMI transmission/reception section 280 reads out, from the image storage section 260, frame data of the CG chroma key image generated by the image generation section 230, and transmits the frame data to the head-mounted display 100 in accordance with the HDMI.

Figure 9:
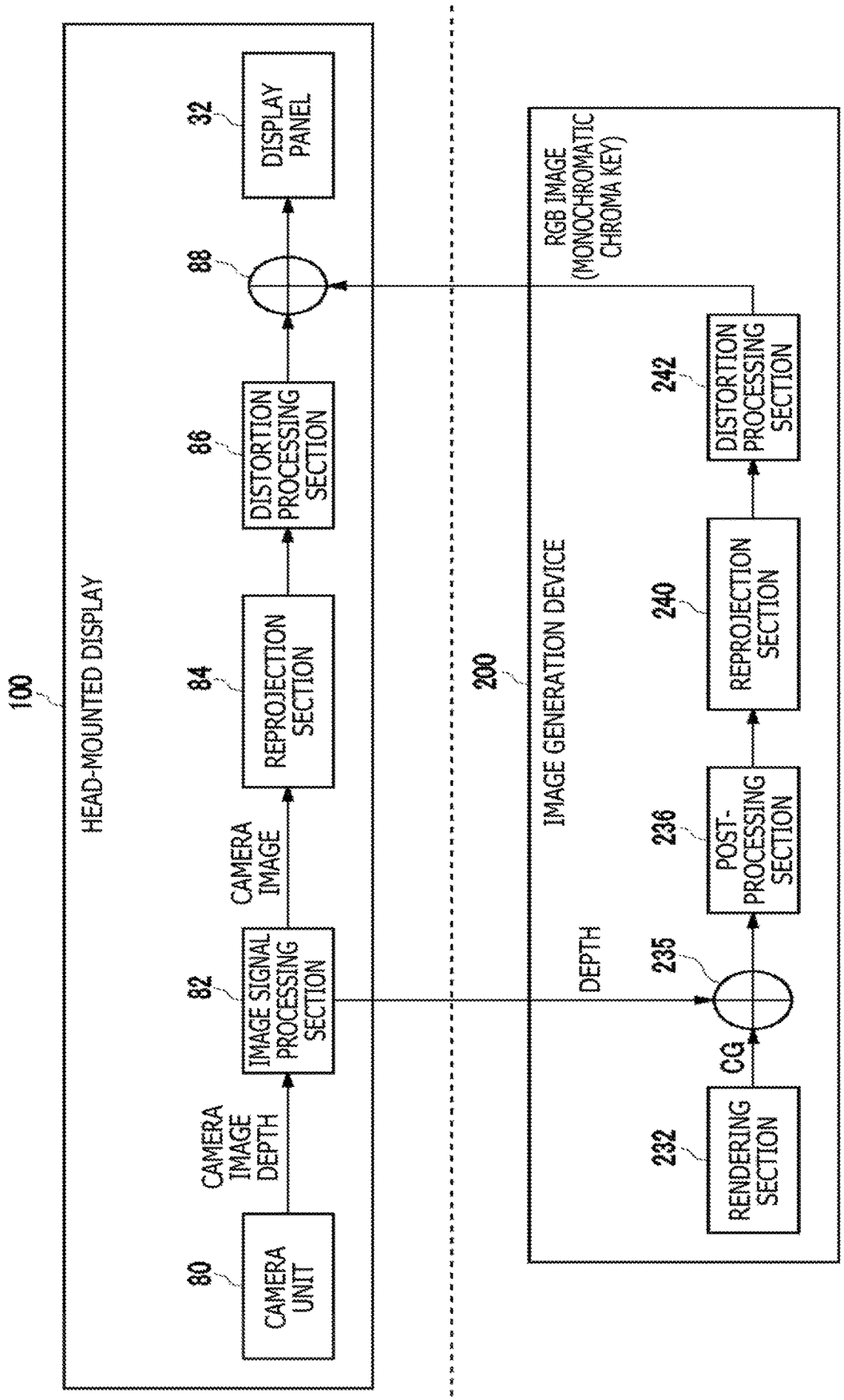
FIG. 9 is a diagram illustrating a configuration of an image generation system according to the premise technique, for superimposing a CG image on a camera image to generate an augmented reality image.

FIG. 9 is a diagram illustrating a configuration of an image generation system according to the premise technique, for superimposing a CG image on a camera image to generate an augmented reality image. Here, to simplify the description, a description is given with illustrations of principal configurations of the head-mounted display 100 and the image generation device 200 for generating an augmented reality image.

An outside world camera image captured by the camera unit 80 of the head-mounted display 100 and depth information are supplied to the image signal processing section 82. The image signal processing section 82 performs the image signal processing and the distortion correction processing on the camera image, and sends the resultant to the reprojection section 84. The image signal processing section 82 transmits the depth information to the image generation device 200 to supply the depth information to the chroma key generation section 235.

The rendering section 232 of the image generation device 200 generates virtual objects viewable from the viewpoint position/line-of-sight direction of the user wearing the head-mounted display 100, and sends the virtual objects to the chroma key generation section 235.

The chroma key generation section 235 generates a CG chroma key image from the CG image on the basis of the depth information. The post-processing section 236 performs the post-processing on the CG chroma key image. The reprojection section 240 converts the CG chroma key image subjected to the post-processing such that the resultant matches the latest viewpoint position/line-of-sight direction. The distortion processing section 242 performs the distortion processing on the CG chroma key image after reprojection. A final RGB image after the distortion processing is transmitted to the head-mounted display 100 to be supplied to the AR superimposing section 88. This RGB image is an image in which a region on which the camera image is to be superimposed is filled with one color (for example, red) specified by chroma key compositing. One color specified as a chroma key cannot be used in the CG image, and hence, the CG image is expressed with the use of colors other than one color specified as the chroma key.

The reprojection section 84 of the head-mounted display 100 converts the camera image subjected to the image signal processing and the distortion correction processing such that the resultant matches the latest viewpoint position/line-of-sight direction, and supplies the resultant to the distortion processing section 86. The distortion processing section 86 performs the distortion processing on the camera image after reprojection. The AR superimposing section 88 superimposes the CG chroma key image that is supplied from the image generation device 200 on the camera image after the distortion processing, to thereby generate an augmented reality image. The generated augmented reality image is displayed on the display panel 32.

In the image generation system according to the premise technique described above, the CG chroma key image generated by the chroma key generation section 235 is subjected to the post-processing by the post-processing section 236, the reprojection processing by the reprojection section 240, and the distortion processing by the distortion processing section 242. Thus, aliasing occurs at a boundary of a virtual object, or a false color which are not actually present occurs, with the result that superimposition of a CG chroma key image on a camera image by the AR superimposing section 88 results in an unnatural image. Further, general image transmission interfaces support RGB, but do not support RGBA including an alpha value and cannot transmit the alpha value. This leads to a restriction that a translucent CG image cannot be expressed.

Now, image generation systems according to some embodiments that overcome the problems of the image generation system according to the premise technique are described below. Descriptions overlapping with those of the premise technique are appropriately omitted, and configurations having improvement from the premise technique are described.

A first embodiment is described. The configuration of the head-mounted display 100 is the same as the one illustrated in FIG. 7.

Figure 10:
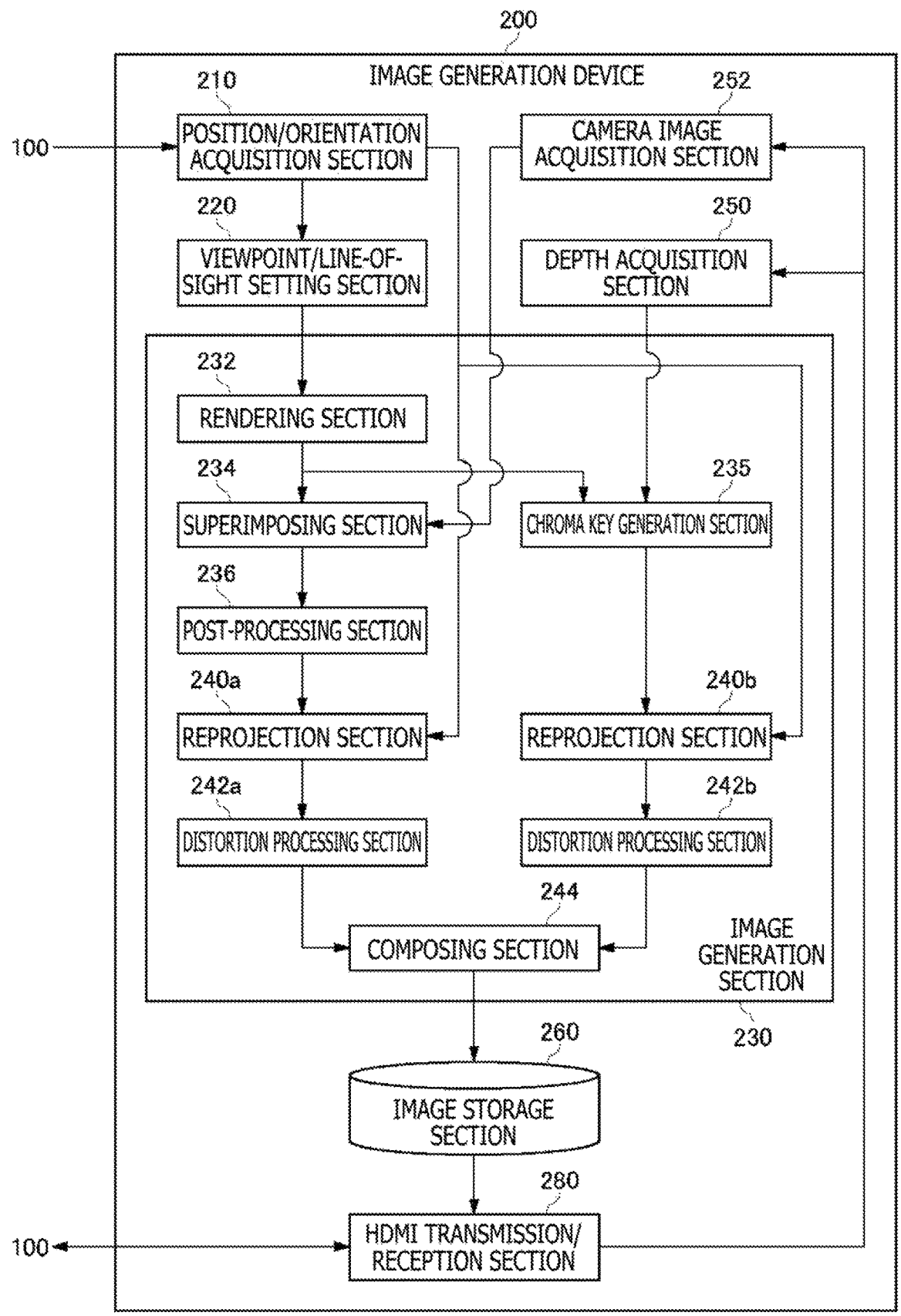
FIG. 10 is a functional configuration diagram of an image generation device according to a first embodiment.

FIG. 10 is a functional configuration diagram of the image generation device 200 according to the first embodiment.

The HDMI transmission/reception section 280 receives, from the head-mounted display 100, a camera image captured by the camera unit 80 and depth information, and supplies the camera image to the camera image acquisition section 252 and the depth information to the depth acquisition section 250.

The image generation section 230 reads out data necessary for computer graphics generation from the image storage section 260, and renders a virtual space object to generate a CG image. The image generation section 230 superimposes the CG image on a camera image that is supplied from the camera image acquisition section 252 to generate a provisional superimposed image, and generates a CG chroma key image from the CG image on the basis of depth information that is supplied from the depth acquisition section 250. The provisional superimposed image is subjected to the post-processing, the reprojection processing, and the distortion processing, while the CG chroma key image is subjected to the reprojection processing and the distortion processing. It should be noted that the CG chroma key image is not subjected to the post-processing. Finally, the provisional superimposed image is masked with the CG chroma key image, and a final CG chroma key image is obtained through composing to be output to the image storage section 260.

The image generation section 230 includes the rendering section 232, the superimposing section 234, the chroma key generation section 235, the post-processing section 236, reprojection sections 240a and 240b, distortion processing sections 242a and 242b, and a composing section 244.

The rendering section 232 renders, in accordance with the viewpoint position and line-of-sight direction of the user set by the viewpoint/line-of-sight setting section 220, a virtual space object viewable from the viewpoint position of the user wearing the head-mounted display 100 in the line-of-sight direction to generate a CG image. The rendering section 232 sends the CG image to the superimposing section 234 and the chroma key generation section 235.

The superimposing section 234 superimposes the CG image on the camera image sent from the camera image acquisition section 252 to generate a provisional superimposed image, and sends the provisional superimposed image to the post-processing section 236.

The post-processing section 236 performs the post-processing on provisional superimposed image in such a way that the provisional superimposed image appears natural and smooth.

The first reprojection section 240a receives, from the position/orientation acquisition section 210, the latest position/orientation information regarding the head-mounted display 100. The first reprojection section 240a performs the reprojection processing on the provisional superimposed image subjected to the post-processing, thereby converting the provisional superimposed image into an image viewable from the latest viewpoint position/line-of-sight direction of the head-mounted display 100.

The first distortion processing section 242a performs the distortion processing on the provisional superimposed image subjected to the reprojection processing, and sends the resultant to the composing section 244.

The chroma key generation section 235 generates a CG chroma key image from the CG image on the basis of depth information regarding the camera image sent from the depth acquisition section 250.

The CG chroma key image is not subjected to the post-processing.

The second reprojection section 240b receives, from the position/orientation acquisition section 210, the latest position/orientation information regarding the head-mounted display 100. The second reprojection section 240b performs the reprojection processing on the CG chroma key image, thereby converting the CG chroma key image into an image viewable from the latest viewpoint position/line-of-sight direction of the head-mounted display 100.

The second distortion processing section 242b performs the distortion processing on the CG chroma key image subjected to the reprojection processing, and sends the resultant to the composing section 244.

The composing section 244 performs composing with a provisional superimposed image and a CG chroma key image being used as a mask to generate a composed CG chroma key image, and stores the composed CG chroma key image in the image storage section 260.

The HDMI transmission/reception section 280 reads out, from the image storage section 260, frame data of the composed CG chroma key image generated by the image generation section 230, and transmits the frame data to the head-mounted display 100 in accordance with the HDMI.

Figure 11:
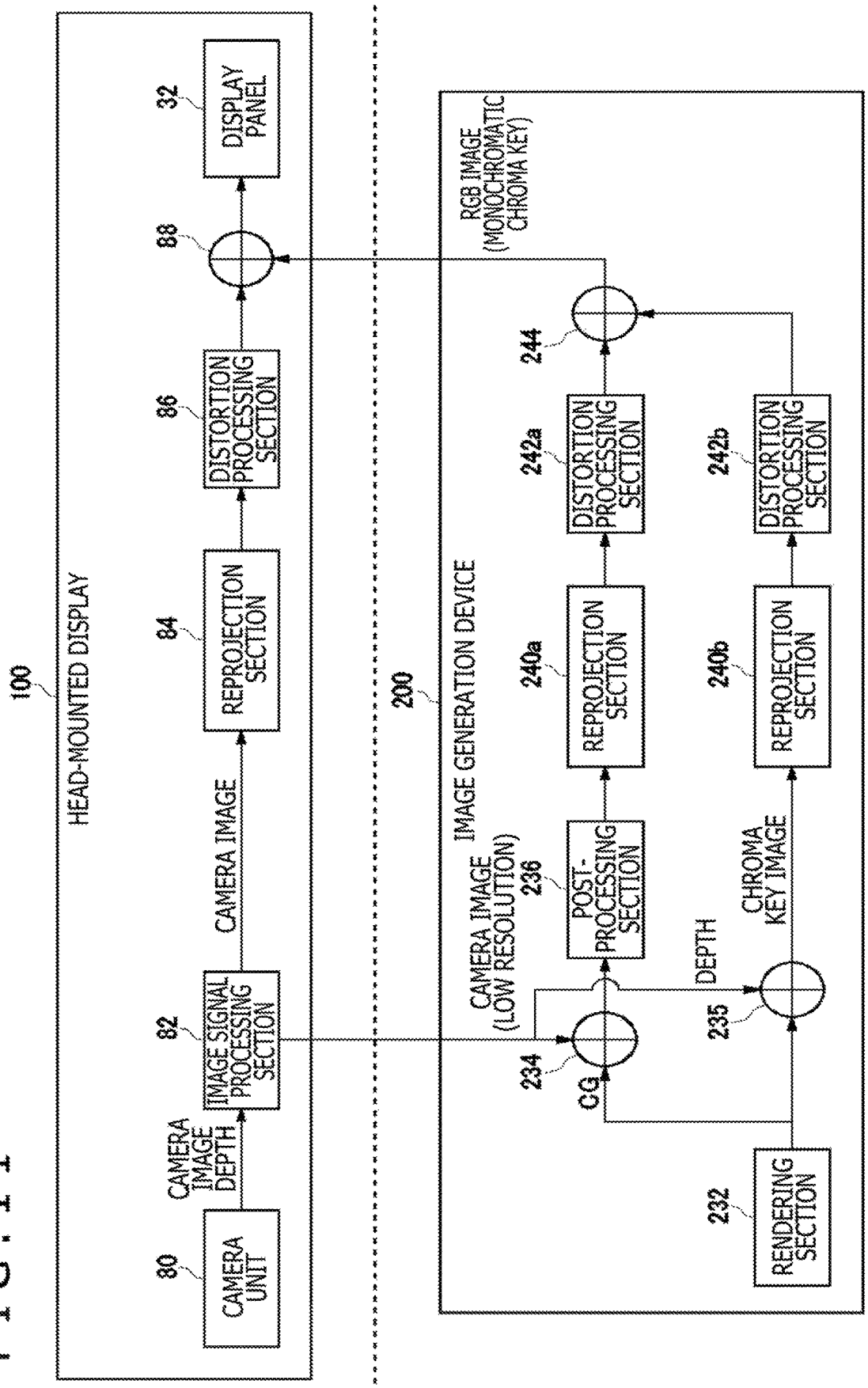
FIG. 11 is a diagram illustrating a configuration of an image generation system according to the first embodiment, for superimposing a CG image on a camera image to generate an augmented reality image.

FIG. 11 is a diagram illustrating a configuration of an image generation system according to the first embodiment, for superimposing a CG image on a camera image to generate an augmented reality image.

An outside world camera image captured by the camera unit 80 of the head-mounted display 100 and depth information are supplied to the image signal processing section 82. The image signal processing section 82 performs the image signal processing and the distortion correction processing on the camera image, and sends the resultant to the reprojection section 84. In addition, the image signal processing section 82 transmits the camera image subjected to the image signal processing and the distortion correction processing and the depth information to the image generation device 200. The camera image is supplied to the superimposing section 234, while the depth information is supplied to the chroma key generation section 235.

The rendering section 232 of the image generation device 200 generates a virtual object viewable from the viewpoint position/line-of-sight direction of the user wearing the head-mounted display 100, and sends the virtual object to the superimposing section 234 and the chroma key generation section 235.

The superimposing section 234 superimposes the camera image on the CG image to generate a provisional superimposed image, and sends the provisional superimposed image to the post-processing section 236. Here, the head-mounted display 100 may provide a camera image with low-resolution. This is because a portion of the camera image in the provisional superimposed image is masked with a CG chroma key image to be removed in the end.

The post-processing section 236 performs the post-processing on the provisional superimposed image. The reprojection section 240a converts the provisional superimposed image subjected to the post-processing such that the resultant matches the latest viewpoint position/line-of-sight direction. The distortion processing section 242a performs the distortion processing on the provisional superimposed image after reprojection, and sends the resultant to the composing section 244.

The chroma key generation section 235 generates a CG chroma key image from the CG image on the basis of the depth information. The reprojection section 240b converts the CG chroma key image such that the resultant matches the latest viewpoint position/line-of-sight direction. The distortion processing section 242b performs the distortion processing on the CG chroma key image after reprojection, and sends the resultant to the composing section 244.

The composing section 244 masks the provisional superimposed image with the CG chroma key image to generate a composed CG chroma key image. Here, the provisional superimposed image is subjected to the post-processing and is thus a smooth image, so that the boundary between the camera image and the CG image is not conspicuous. Meanwhile, the CG chroma key image is not subjected to the post-processing, and hence, neither aliasing nor a false color occurs at the boundary of the virtual object. Thus, by masking a superimposed image subjected to the post-processing with a CG chroma key image not subjected to the post-processing, a natural and smooth CG chroma key image in which neither aliasing nor a false color occurs at the boundary of the virtual object is obtained through composing.

The composed CG chroma key image is transmitted to the head-mounted display 100 as an RGB image having one specific color specified as a chroma key, thereby being supplied to the AR superimposing section 88.

The reprojection section 84 of the head-mounted display 100 converts the camera image subjected to the image signal processing and the distortion correction processing such that the resultant matches the latest viewpoint position/line-of-sight direction, and supplies the resultant to the distortion processing section 86. The distortion processing section 86 performs the distortion processing on the camera image after reprojection. The AR superimposing section 88 superimposes the composed CG chroma key image that is supplied from the image generation device 200 on the camera image after the distortion processing, to thereby generate an augmented reality image. The generated augmented reality image is displayed on the display panel 32.

According to the image generation system of the first embodiment, the post-processing reduces a sense of incongruity at the boundary between the camera image and the CG image, and the chroma key image without aliasing and a false color is generated because the chroma key image is not subjected to the post-processing, with the result that a high-quality composed CG chroma key image can be generated. This composed CG chroma key image is superimposed on the camera image to generate an augmented reality image, and a natural augmented reality image can therefore be generated. Further, even in a case where the CG image has a translucent portion, translucent processing can be performed when the CG image is superimposed on the camera image to be subjected to the post-processing, and hence, the translucent portion can also be expressed although there is latency due to rendering. Further, the composed CG chroma key image is an RGB image having one specific color as a chroma key, and can thus be transmitted by general communication interfaces compatible with transmission of the RBG image, such as HAMI.

A second embodiment is described. A configuration of the head-mounted display 100 is basically the same as that illustrated in FIG. 7. The reprojection section 84, however, includes a first reprojection section 84a for camera images and a second reprojection section 84b for composed CG chroma key images.

Figure 12:
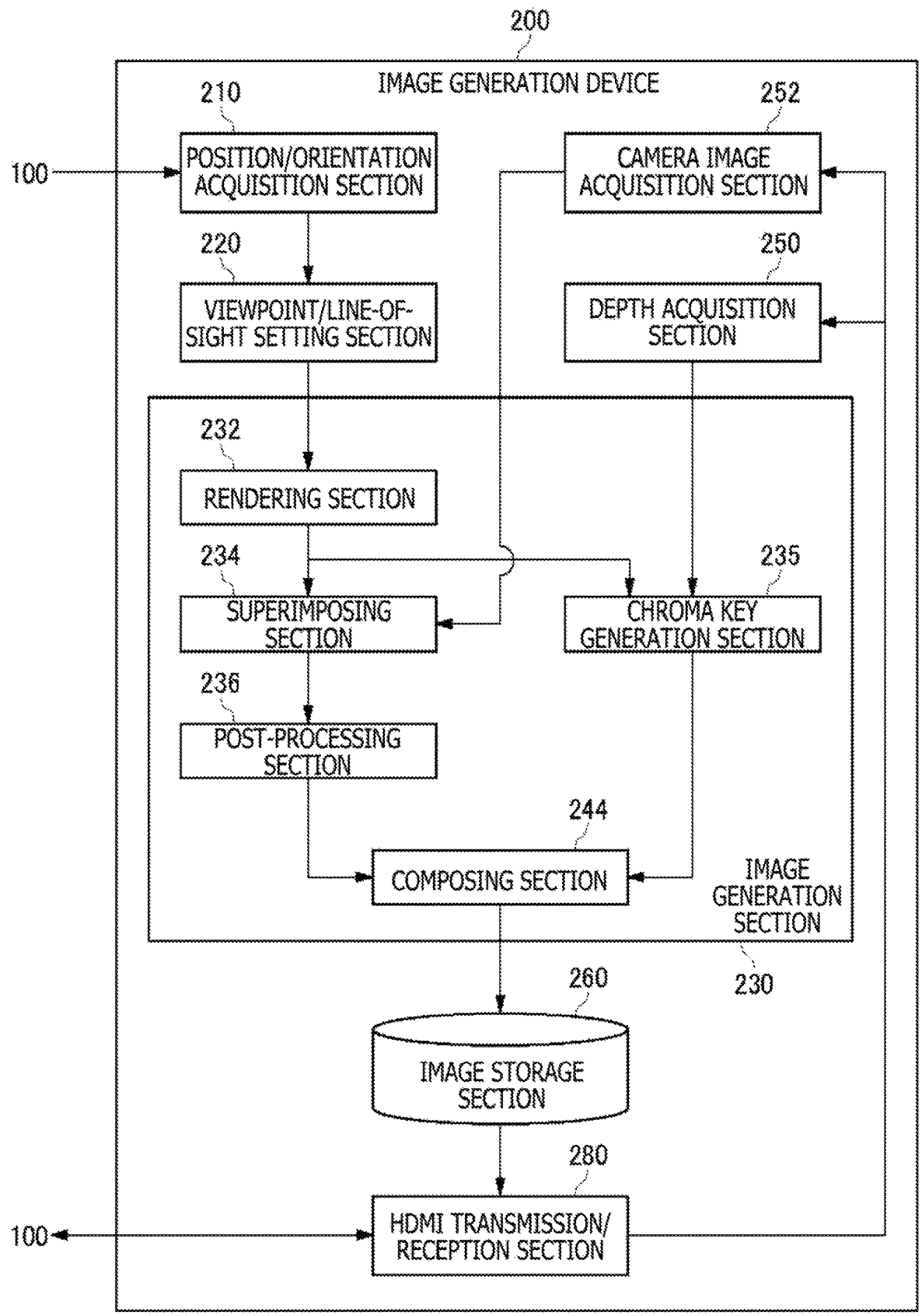
FIG. 12 is a functional configuration diagram of an image generation device according to a second embodiment.

FIG. 12 is a functional configuration diagram of the image generation device 200 according to the second embodiment.

The HDMI transmission/reception section 280 receives, from the head-mounted display 100, a camera image captured by the camera unit 80 and depth information, and supplies the camera image to the camera image acquisition section 252 and the depth information to the depth acquisition section 250.

The image generation section 230 reads out data necessary for computer graphics generation from the image storage section 260, and renders a virtual space object to generate a CG image. The image generation section 230 superimposes the CG image on the camera image that is supplied from the camera image acquisition section 252 to generate a provisional superimposed image, and generates a CG chroma key image from the CG image on the basis of depth information that is supplied from the depth acquisition section 250. The superimposed image is subjected to the post-processing, but the CG chroma key image is not subjected to the post-processing. Finally, the provisional superimposed image is masked with the CG chroma key image, and a final CG chroma key image is obtained through composing to be output to the image storage section 260.

The image generation section 230 includes the rendering section 232, the superimposing section 234, the chroma key generation section 235, the post-processing section 236, and the composing section 244.

The rendering section 232 renders, in accordance with the viewpoint position and line-of-sight direction of the user set by the viewpoint/line-of-sight setting section 220, a virtual space object viewable from the viewpoint position of the user wearing the head-mounted display 100 in the line-of-sight direction to generate a CG image. The rendering section 232 sends the CG image to the superimposing section 234 and the chroma key generation section 235.

The superimposing section 234 superimposes the CG image on the camera image sent from the camera image acquisition section 252 to generate a provisional superimposed image, and sends the provisional superimposed image to the post-processing section 236.

The post-processing section 236 performs the post-processing on the provisional superimposed image in such a way that the provisional superimposed image appears natural and smooth.

The chroma key generation section 235 generates a CG chroma key image from the CG image on the basis of the depth information regarding the camera image sent from the depth acquisition section 250.

The composing section 244 performs composing with the provisional superimposed image and the CG chroma key image being used as a mask to generate a composed CG chroma key image, and stores the composed CG chroma key image in the image storage section 260.

The HDMI transmission/reception section 280 reads out, from the image storage section 260, frame data of the composed CG chroma key image generated by the image generation section 230, and transmits the frame data to the head-mounted display 100 in accordance with the HDMI.

FIG. 13 is a diagram illustrating the configuration of an image generation system according to the second embodiment, for superimposing a CG image on a camera image to generate an augmented reality image.

An outside world camera image captured by the camera unit 80 of the head-mounted display 100 and depth information are supplied to the image signal processing section 82. The image signal processing section 82 performs the image signal processing and the distortion correction processing on the camera image, and sends the resultant to the reprojection section 84. In addition, the image signal processing section 82 transmits the camera image subjected to the image signal processing and the distortion correction processing and the depth information to the image generation device 200. The camera image is supplied to the superimposing section 234, while the depth information is supplied to the chroma key generation section 235.

The rendering section 232 of the image generation device 200 generates a virtual object viewable from the viewpoint position/line-of-sight direction of the user wearing the head-mounted display 100, and sends the virtual object to the superimposing section 234 and the chroma key generation section 235.

The superimposing section 234 superimposes the camera image on the CG image to generate a provisional superimposed image, and sends the provisional superimposed image to the post-processing section 236. Similar to the first embodiment, the head-mounted display 100 may provide a camera image with low-resolution.

The post-processing section 236 performs the post-processing on the provisional superimposed image, and sends the resultant to the composing section 244.

The chroma key generation section 235 generates a CG chroma key image from the CG image on the basis of the depth information, and sends the CG chroma key image to the composing section 244.

The composing section 244 masks the superimposed image with the CG chroma key image to generate a composed CG chroma key image. Similar to the first embodiment, by masking a superimposed image subjected to the post-processing with a CG chroma key image not subjected to the post-processing, a natural and smooth CG chroma key image in which neither aliasing nor a false color occurs at the boundary of the virtual object is obtained through composing.

The composed CG chroma key image is transmitted to the head-mounted display 100 as an RGB image having one specific color specified as a chroma key, thereby being supplied to the reprojection section 84b.

The first reprojection section 84a of the head-mounted display 100 converts the camera image subjected to the image signal processing and the distortion correction processing such that the resultant matches the latest viewpoint position/line-of-sight direction, and supplies the resultant to the AR superimposing section 88.

The second reprojection section 84b of the head-mounted display 100 converts the composed CG chroma key image such that the resultant matches the latest viewpoint position/line-of-sight direction, and supplies the resultant to the AR superimposing section 88.

Here, the reason that the head-mounted display 100 includes separately the first reprojection section 84a for camera images and the second reprojection section 84b for composed CG chroma key images is that the image generation device 200 takes time for rendering, and hence, amounts of difference to be corrected by reprojection are different from each other. For example, it is necessary that, while the first reprojection section 84a performs reprojection for one frame forward, the second reprojection section 84b performs reprojection for two frames forward.

The AR superimposing section 88 superimposes the composed CG chroma key image subjected to the reprojection processing by the second reprojection section 84b on the camera image subjected to the reprojection processing by the first reprojection section 84a, to thereby generate an augmented reality image. The AR superimposing section 88 supplies the generated augmented reality image to the distortion processing section 86.

The distortion processing section 86 performs the distortion processing on the augmented reality image. The generated augmented reality image is displayed on the display panel 32.

According to the image generation system of the second embodiment, similar to the first embodiment, there is an advantage that natural augmented reality image can be generated because an augmented reality image is generated by superimposing a composed CG chroma key image on a camera image. The image generation system of the second embodiment also has the following advantage. Unlike the first embodiment, the reprojection processing is performed on the camera image and the composed CG chroma key image on the head-mounted display 100 side. Thus, the camera image and the composed CG chroma key image can be converted such that the resultant matches a viewpoint position/line-of-sight direction immediately before the image is displayed on the display panel 32, with the result that an augmented reality image having followability with high accuracy can be provided. Further, the reprojection processing load on the image generation device 200 side can be reduced, and hence, more resources can be used for rendering on the image generation device 200 side.

In the configurations of the first and second embodiments, the CG chroma key image is not subjected to the post-processing by the post-processing section 236. As a configuration of a modified example, however, post-processing for viewpoint matching or scaling may be applied to the CG chroma key image. In this case, when a method that interpolates a pixel by using the average value of surrounding pixels is employed, for example, the color of the boundary is changed to a color different from a chroma key color. Accordingly, it is necessary to apply post-processing such that an original chroma key color remains. Alternatively, after normal post-processing that changes the color of the boundary is applied to the CG chroma key image, only a region that completely matches the original chroma key color may be used as a mask.

The present invention has been described above on the basis of the embodiments. The embodiments are exemplary, and it will be understood by those skilled in the art that various modifications to the components and processing processes of the embodiments can be made and that such modifications are also within the scope of the present invention.

REFERENCE SIGNS LIST

10 Control section, 20 Input interface, 30 Output interface, 32 Display panel, 40 Communication control section, 42 Network adapter, 44 Antenna, 50 Storage section, 64 Orientation sensor, 70 External input/output terminal interface, 72 External memory, 80 Camera unit, 82 Image signal processing section, 84 Reprojection section, 86 Distortion processing section, 88 AR superimposing section, 100 Head-mounted display, 200 Image generation device, 210 Position/orientation acquisition section, 220 Viewpoint/line-of-sight setting section, 230 Image generation section, 232 Rendering section, 234 Superimposing section, 235 Chroma key generation section, 236 Post-processing section, 240 Reprojection section, 242 Distortion processing section, 244 Composing section, 250 Depth acquisition section, 252 Camera image acquisition section, 260 Image storage section, 280 HDMI transmission/reception section, 300 Interface.

INDUSTRIAL APPLICABILITY

The present invention can be utilized in the field of image generation.

The invention claimed is:

1. An image generation device comprising:
   a superimposing section configured to superimpose a computer graphics image on a captured real space image to generate a provisional superimposed image;
   a chroma key generation section configured to generate a chroma key image;
   a distortion processing section configured to perform distortion processing on the provisional superimposed image and the chroma key image; and
   a composing section configured to mask the provisional superimposed image subjected to the distortion processing with the chroma key image subjected to the distortion processing, to thereby generate a composed chroma key image,
   wherein the composed chroma key image is superimposed on the captured real space image to generate an augmented reality image.

2. The image generation device according to claim 1, further comprising:
   a reprojection section configured to convert the provisional superimposed image and the chroma key image such that the provisional superimposed image and the chroma key image match a new viewpoint position or line-of-sight direction,
   wherein the composing section masks the provisional superimposed image subjected to reprojection processing with the chroma key image subjected to the reprojection processing, to thereby generate the composed chroma key image.

3. The image generation device according to claim 1, wherein the captured real space image that the superimposing section uses to generate the provisional superimposed image has a lower resolution than the captured real space image that is used to generate the augmented reality image.

4. The image generation device according to claim 1, wherein the chroma key generation section determines a positional relation of a virtual space object to generate the chroma key image.

5. The image generation device according to claim 4, wherein the chroma key generation section determines a positional relation between a real space object and the virtual space object to generate the chroma key image.

6. The image generation device according to claim 1, wherein the chroma key generation section performs the chroma key processing on the computer graphics image on a basis of depth information regarding the captured real space image, to thereby generate the chroma key image.

7. The image generation device according to claim 1, further comprising:
a post-processing section configured to perform post-processing on the provisional superimposed image,
wherein the composing section masks the provisional superimposed image subjected to the post-processing with the chroma key image, to thereby generate the composed chroma key image.

8. An image generation system comprising:
a head-mounted display; and
an image generation device,
wherein the image generation device includes
a first superimposing section configured to superimpose a computer graphics image on a captured real space image that is transmitted from the head-mounted display, to thereby generate a superimposed image,
a chroma key generation section configured to generate a chroma key image,
a first reprojection section configured to convert the superimposed image and the chroma key image such that the superimposed image and the chroma key image match a new viewpoint position or line-of-sight direction;
a distortion processing section configured to perform distortion processing on the superimposed image and the chroma key image; and
a composing section configured to mask the superimposed image subjected to reprojection processing and subjected to the distortion processing with the chroma key image subjected to the reprojection processing and subjected to the distortion processing, to thereby generate a composed chroma key image, and
the head-mounted display includes
a second reprojection section configured to convert the captured real space image such that the captured real space image matches the new viewpoint position or line-of-sight direction, and
a second superimposing section configured to compose the captured real space image subjected to the reprojection processing by the second reprojection section with the composed chroma key image that is transmitted from the image generation device, to thereby generate an augmented reality image.

9. An image generation system comprising:
a head-mounted display; and
an image generation device,
wherein the image generation device includes
a first superimposing section configured to superimpose a computer graphics image on a captured real space image that is transmitted from the head-mounted display, to thereby generate a provisional superimposed image,
a chroma key generation section configured to generate a chroma key image,
a distortion processing section configured to perform distortion processing on the provisional superimposed image and the chroma key image, and
a composing section configured to mask the provisional superimposed image subjected to the distortion processing with the chroma key image subjected to the distortion processing, to thereby generate a composed chroma key image, and
the head-mounted display includes
a first reprojection section configured to convert the captured real space image such that the captured real space image matches a new viewpoint position or line-of-sight direction,
a second reprojection section configured to convert the composed chroma key image that is transmitted from the image generation device such that the composed chroma key image matches the new viewpoint position or line-of-sight direction, and
a second superimposing section configured to compose the captured real space image subjected to reprojection processing by the first reprojection section with the composed chroma key image subjected to the reprojection processing by the second reprojection section, to thereby generate an augmented reality image.

10. An image generation method comprising:
superimposing a computer graphics image on a captured real space image to generate a provisional superimposed image;
performing chroma key processing to thereby generate a chroma key image;
performing distortion processing on the provisional superimposed image and the chroma key image; and
masking the provisional superimposed image subjected to the distortion processing with the chroma key image subjected to the distortion processing, to thereby generate a composed chroma key image,
wherein the composed chroma key image is used for being superimposed on the captured real space image to generate an augmented reality image.

11. An image generation device comprising:
a rendering section configured to render a virtual space object to generate a computer graphics image;
a chroma key generation section configured to generate a chroma key image;
a distortion processing section configured to perform distortion processing on the provisional superimposed image and the chroma key image; and
a composing section configured to mask the provisional superimposed image subjected to the distortion processing with the chroma key image subjected to the distortion processing, to thereby generate a composed chroma key image,
wherein the chroma key generation section determines a positional relation between a real space object and the virtual space object to generate the chroma key image.

* * * * *